(12) United States Patent
Buerk et al.

(10) Patent No.: US 12,508,036 B2
(45) Date of Patent: Dec. 30, 2025

(54) MEDICAL INSTRUMENT SYSTEM COMPRISING A SURGICAL TOOL

(71) Applicant: Aesculap AG, Tuttlingen (DE)

(72) Inventors: André Buerk, Villingen-Schwenningen (DE); Roland-Alois Hoegerle, Tuttlingen (DE); Ralf Pfister, Trossingen (DE)

(73) Assignee: Aesculap AG, Tuttlingen (DE)

( * ) Notice: Subject to any disclaimer, the term of this patent is extended or adjusted under 35 U.S.C. 154(b) by 349 days.

(21) Appl. No.: 18/027,446

(22) PCT Filed: Sep. 22, 2020

(86) PCT No.: PCT/EP2020/076406
§ 371 (c)(1),
(2) Date: Mar. 21, 2023

(87) PCT Pub. No.: WO2022/063390
PCT Pub. Date: Mar. 31, 2022

(65) Prior Publication Data
US 2023/0329725 A1    Oct. 19, 2023

(51) Int. Cl.
*A61B 17/16* (2006.01)
*A61B 17/00* (2006.01)
*A61B 17/29* (2006.01)

(52) U.S. Cl.
CPC ...... *A61B 17/1624* (2013.01); *A61B 17/1631* (2013.01); *A61B 2017/00473* (2013.01);
(Continued)

(58) Field of Classification Search
CPC ............ A61B 17/1624; A61B 17/1631; A61B 2017/2929
See application file for complete search history.

(56) References Cited

U.S. PATENT DOCUMENTS

| | | | | |
|---|---|---|---|---|
| 5,928,241 | A * | 7/1999 | Menut | A61B 17/162 279/22 |
| 9,175,723 | B2 * | 11/2015 | Blust | F16C 33/4605 |
| 9,877,763 | B2 * | 1/2018 | Barth | A61B 17/8866 |

FOREIGN PATENT DOCUMENTS

| | | |
|---|---|---|
| DE | 102012108266 A1 | 3/2014 |
| DE | 102018122025 A1 | 3/2020 |

(Continued)

OTHER PUBLICATIONS

Search Report received in International Application No. PCT/EP2020/076406 dated Jun. 7, 2021, with translation, 5 pages.
(Continued)

*Primary Examiner* — Eric D. Bertram
(74) *Attorney, Agent, or Firm* — Christopher A. Rothe; CM Law

(57) ABSTRACT

A medical instrument system includes a handpiece and a surgical tool. The handpiece has a housing in which a drive and/or a gearing mechanism is accommodated and which preferably has a housing part which is or can be attached to the housing. The surgical tool is supported on the housing and/or the housing part by a plurality of rotary bearings. The surgical tool is or can be coupled to the drive and/or gearing mechanism for conjoint rotation and in an axially fixed manner so as to transmit a torque from the drive and/or gearing mechanism to the tool. A first of the rotary bearings at a distal end portion of the tool is connected to the tool to form a unit. A second of the rotary bearings is accommodated in the housing or the housing part, proximally to the first rotary bearing, so as to be stationary.

16 Claims, 4 Drawing Sheets

(52) U.S. Cl.
CPC .............. *A61B 2017/00477* (2013.01); *A61B 2017/2929* (2013.01)

(56) References Cited

FOREIGN PATENT DOCUMENTS

| | | |
|---|---|---|
| WO | 9700149 A1 | 1/1997 |
| WO | 0160261 A2 | 8/2001 |

OTHER PUBLICATIONS

Written Opinion received in International Application No. PCT/EP2020/076406 dated Jun. 7, 2021, with translation, 11 pages.

* cited by examiner

MEDICAL INSTRUMENT SYSTEM COMPRISING A SURGICAL TOOL

CROSS-REFERENCE TO RELATED APPLICATION(S)

This application is the United States national stage entry of International Application No. PCT/EP2020/076406, filed Sep. 22, 2020, the content of which is incorporated by reference herein in its entirety.

FIELD

The present disclosure relates to a medical or surgical instrument system comprising a handpiece or instrument which has a housing in which a drive, for example a motor (electric motor, turbine, etc.) and/or a gearing mechanism which can be activated (if applicable externally), is housed, and a surgical tool, in particular a surgical milling or drilling tool, supported via at least two pivot bearings against the housing and/or against a housing part connected or connectable to the housing and which is coupled to the drive and/or gearing mechanism in a rotationally and axially fixed manner, preferably via a torque transmission cable/path, in order to transmit a torque or a rotation of the drive and/or gearing mechanism to the tool.

BACKGROUND

Medical instrument systems with surgical tools, such as surgical milling tools or drilling tools, are known from the prior art, which have a tool shaft with a proximal and a distal end portion, which is a working end with an effector. The tool is coupleable with its proximal end portion via a coupling structure/gearing mechanism cable/path to a drive in a housing in a rotationally and axially fixed manner in order to transmit a rotational movement of the drive to the tool, which then rotates about its longitudinal axis in the case of an actively operated device (activation of the drive). For the required bearing of the tool relative to the housing, at least one pivot bearing is arranged between the tool and the housing. The tools are usually interchangeably connected/coupled to the housing, so that the housing can be used several times and can be equipped with different or respectively different types of tools.

Such a tool is known, for example, from U.S. RE 29,736, wherein the tool is configured as a surgical drill. The tool shaft has a circumferential running groove near its proximal end, in which balls that are fixedly received in a multi-part housing can circulate relative to the housing in order to support the tool shaft. The tool shaft is axially displaceable relative to the housing. In the event that the balls are defective, the part of the housing in which the balls are housed has to be replaced.

Furthermore, a surgical tool with a bearing is known from U.S. Pat. No. 9,175,723 B2. Here, the tool is rotatably mounted in a housing shaft towards its proximal end portion by several ball bearings. Towards its distal end portion, the tool is mounted in the housing shaft via needle bearings. All pivot bearings are firmly integrated in the housing shaft or in the housing, respectively.

This creates the problem that such pivot bearings, which support tools in the housing and are wear parts, are subjected to great stress in the housing, such as corrosion, contamination and overloading. At the same time, the housings in which the pivot bearings are integrated are used many times. This may cause damage to the pivot bearing, so that the pivot bearings are in a defective condition and have to be repaired or replaced. During the period of repair or replacement, the housing or handpiece cannot be used for its intended purpose, resulting in time loss and costs for the user of the tool.

It is therefore an aim of the disclosure to provide a medical instrument system comprising an interchangeable surgical tool and a handpiece comprising a housing, which makes it possible to increase the availability of the housing with a drive housed therein and/or a gearing mechanism coupleable to the surgical tool with respect to the at least one bearing supporting the tool in the housing.

SUMMARY

In order to solve the object, a medical or surgical instrument system is provided. In particular, the instrument system has a handpiece with a housing, in which a drive/drive unit and/or a gearing mechanism is housed and which preferably has a housing part connected or connectable thereto, and a surgical tool supported via several, at least two pivot bearings against the housing and/or the housing part. The tool is configured, for example, as a surgical milling or drilling tool and is coupled or coupleable to the drive and/or the gearing mechanism in a rotationally and axially fixed manner, preferably via a torque transmission cable/path, in order to transmit a torque of the drive to the tool. A first pivot bearing arranged in the area of a distal end portion of the tool is connected to the tool to form a unit, and a second pivot bearing arranged proximally is housed in a fixed position in the housing. I.e. the first pivot bearing is connected to the tool shaft to form a unit, which in its entirety is insertable into the housing and/or the housing part for coupling with the drive and/or the gearing mechanism and is withdrawable from the housing and/or the housing part for uncoupling from the drive or the gearing mechanism, respectively, while the second pivot bearing remains in the housing or the housing part even after uncoupling of the tool from the drive and/or from the gearing mechanism.

In other words, the medical instrument system is provided whose surgical tool, in particular surgical milling tool, has a tool shaft as well as a distal and a proximal end portion. The tool is interchangeably inserted with its proximal end portion into a housing and/or a housing part of a handpiece connected or connectable thereto and is rotationally and axially fixedly coupled to a drive and/or a gearing mechanism in the housing in order to be able to execute the rotational movement or the torque generated by the drive about its longitudinal axis. The tool is mounted in the housing and/or the housing part or is supported against the housing or the housing part via at least two bearing/pivot bearing/bearing elements. A pivot bearing, in particular the pivot bearing arranged in the area of the distal end portion or facing the distal end portion, is detachably connected, preferably as a snap-in connection or plug-in connection, to the housing or the housing part and is (axially) fixed to the tool in such a way that the pivot bearing forms a unit with the tool shaft.

This means that the pivot bearings, in particular the first pivot bearing, can be renewed independently of the handpiece or housing and optionally together with the tool, and do not have to endure a service interval of the handpiece. Thus, the failure of pivot bearings can be significantly reduced. In the event that a pivot bearing is defective, the tool with permanently integrated pivot bearing or only the pivot bearing itself, which in this case is detachably mounted on/at the tool shaft, is replaced and the corresponding handpiece can continue to be used for its intended purpose.

The replacement of the pivot bearing or of the tool with pivot bearing for the handpiece can be carried out quickly and easily by the user with each tool change. This ensures high availability and reliability of the handpiece. The pivot bearing, which can be replaced independently of the handpiece, results in cost and/or time savings for the user of the surgical tool according to the disclosure.

In other words, in the medical instrument system according to the disclosure, the pivot bearings which support the tool against the housing and/or the housing part are arranged separately, i.e. distributed between the tool and the housing or housing part. The foremost pivot bearing arranged at the distal end portion, i.e. the first pivot bearing, is the bearing subjected to the highest stress. Accordingly, at least the foremost, first pivot bearing is firmly connected to the tool to form a unit. As a result, the pivot bearing is also changed with each change of the tool. The less stressed rear pivot bearings, which face the proximal end portion of the tool shaft, remain in the handpiece.

Preferably, rolling bearings are used as pivot bearings, which have an inner bearing portion with guide, an outer portion with guide and between them a cage with rolling elements mounted therein, which are arranged between the guides of the inner bearing portion and of the outer bearing portion. The rolling bearings, in particular ball bearings, are usually annular and are mounted on the tool shaft in such a way that the pivot bearing and the tool shaft are coaxial with each other. Alternatively, plain bearings may also be used as pivot bearings, which have no rolling elements between their inner and outer bearing portions.

In a preferred configuration example, the first pivot bearing may be formed via multiple pivot bearings, wherein at least the pivot bearing facing the distal end portion is connected to the tool to form a unit. In other words, the first pivot bearing may be constructed as a composite/assembly of multiple pivot bearings. In particular, the first pivot bearing may be configured as a single-row or multi-row, preferably as a double bearing.

Furthermore, the second pivot bearing may also be formed by multiple pivot bearings. In particular, the second pivot bearing may be configured as a single-row or multi-row bearing, preferably as a double bearing.

In addition, the first and/or second pivot bearing may also be a single-row, double-row or multi-row plain bearing which, in contrast to rolling bearings, has no rolling element.

Pivot bearings with multiple rows have a higher load carrying capacity and therefore a longer service life and higher load capacity than single-row pivot bearings. Plain bearings are particularly suitable for low-speed (low number of tool revolutions) applications.

Preferably, the first pivot bearing may be configured separately from the tool shaft, is in particular pushed onto the tool shaft, so that the tool shaft of the tool and the first pivot bearing are connected to form a detachable unit.

The advantage in this embodiment is that the tool is independent of wear of the pivot bearing and can be used several times. In addition, users can easily replace the pivot bearing by themselves if necessary, for example using a ball bearing magazine.

Alternatively, the first pivot bearing may be formed integrally with the tool shaft, in particular it may be pressed onto the tool shaft, so that the tool shaft of the tool, preferably a disposable tool, and the first pivot bearing are connected to form an inseparable unit.

If the pivot bearing, in particular the first pivot bearing, is formed integrally with the tool shaft, the pivot bearing may advantageously be renewed with each tool change, so that the tool is configured as a disposable tool. One way of connecting the pivot bearing to the tool shaft in a non-detachable manner is, as mentioned above, to press the inner bearing portion onto the tool shaft. In the case where the first pivot bearing and the tool form a non-detachable unit, the pivot bearing can achieve better running behavior and there is no slip between the pivot bearing and the tool shaft. Furthermore, the carrying capacity and thus also the load capacity of the pivot bearing is increased.

In a preferred further development, the tool shaft, which is non-detachably connected to the first pivot bearing, has at least one radially circumferential running groove that houses the first pivot bearing, so that the running groove is part of the first pivot bearing.

The formation of a running groove on the tool shaft as part of the first pivot bearing is an alternative solution to pressing the inner bearing portion onto the tool shaft. In the case of such a running groove, the inner bearing portion of the first pivot bearing is omitted and the first pivot bearing is mounted non-replaceably on the tool, but can only be replaced with the tool when the tool is changed. In the case of a rolling bearing, the rolling elements with the outer bearing portion are mounted directly on the tool shaft. The advantage of not having an inner bearing portion is that the pivot bearing has one less component that could wear out or break, which consequently can result in longer use and reliability of the pivot bearing. The production costs for such a pivot bearing are also lower than for conventional pivot bearings with an inner bearing portion. In this space-optimized configuration, the first pivot bearing is a fixed component of the tool. In the case where the running groove takes over the function of the inner bearing portion, the size of the first pivot bearing can also be reduced compared to a conventional pivot bearing, resulting in slimmer working ends. Alternatively, the load rating of the pivot bearing can be increased, contributing to increased bearing life and stability. A higher load rating also allows a greater distance between the first pivot bearing and the distal end portion. Thus, both the reduction in size and the increase in load rating of the pivot bearing are advantageous for access and visibility when using the surgical tool.

Furthermore, the running groove may be in the form of a groove-like depression in the outer circumferential surface of the tool shaft or as an area between two radially circumferential lips spaced apart in the axial direction and rising from the outer circumferential surface of the tool shaft, for example vertically.

Such a groove can be made in the tool shaft easily and inexpensively (e.g. by lathing). At the point where the running groove is formed as a groove, the thickness of the tool shaft is lower than in the adjacent area. This means that the groove may represent a predetermined breaking point for the tool shaft, or at least minimizes the load resistance of the tool. Alternatively, the running groove may also be configured in such a way that two radially circumferential lips rise from the surface of the tool shaft and are spaced apart from each other in the axial direction of the tool shaft. The running groove is thus formed in the area enclosed by the two lips. In this case, the tool shaft is of constant material thickness radially below the running groove and in the axially adjacent area. In any case, the running groove has to be configured in such a way that it fulfills the object of guiding an inner bearing portion.

According to the disclosure, a circumferential flange portion may be formed on the tool shaft, which is formed separately from the first pivot bearing, and may have the first pivot bearing, in particular an inner bearing portion of the first pivot bearing, axially fixed to it.

Furthermore, it is conceivable to provide a cover sleeve arranged at the distal end portion of the housing or of the housing part and connected to the housing or the housing part, preferably in a force-fit manner, in order to axially fix the first pivot bearing, in particular an outer bearing portion of the first pivot bearing, at least indirectly to the housing or the housing part.

It is also advantageous to provide a circumferential wall arranged between the first pivot bearing and the second pivot bearing for axially supporting the two pivot bearings. This circumferential wall may, for example, be in the form of a projection integral/in one piece with the housing or the housing part. Alternatively, it may also be practical to provide a separate spacer sleeve between the first pivot bearing and the second pivot bearing for axial support of the two pivot bearings.

In order to fix the second pivot bearing axially to the housing or the housing part, it is also conceivable to provide a further spacer sleeve in the proximal direction, which is supported against the housing or the housing part, for example via a stop/projection formed on the housing or the housing part.

In a further embodiment, the tool shaft may have at least one radially circumferential, and in particular coaxial and/or integrally formed, projection between the proximal and distal end portions for axially securing the first pivot bearing. The projection directly contacts the pivot bearing with its side face facing the proximal end portion.

The projection serves as protection for the pivot bearing and prevents undesired axial displacement of the first pivot bearing in the direction of the distal end portion. Such a projection is particularly necessary in the case where the first pivot bearing is formed separately from the tool shaft, e.g. pushed on. Furthermore, the projection prevents the loss of the rolling elements in case a rolling bearing is used as pivot bearing.

Preferably, the projection may be conical in the axial direction and thereby the radial dimension of the projection increases from the distal end portion towards the proximal end portion, preferably until the radial dimension of the projection is at least as large as the outer radial dimension of the first pivot bearing. Alternatively, the projection may be planar. The projection may furthermore be at least only so large that its radial dimension corresponds to the radial dimension of an inner bearing portion. The larger the projection, the more effectively it secures the pivot bearing.

In a preferred embodiment, the first pivot bearing has at least one first latching portion on its outer circumferential surface, the housing or housing part provides a second latching portion cooperating with the at least one first latching portion, and the first and second latching portions engage each other in a latching state, thereby contributing to the support of the tool shaft relative to the housing or housing part.

The first latching portion may be a latching nose and the second latching portion may be a recess or vice versa. It is the object of this latching connection to prevent the rotational movement of the drive or of the tool from being transferred to the outer bearing portion. The outer bearing portion therefore cannot perform any rotational movement. When the tool with the firmly attached first pivot bearing is inserted into the handpiece, the latching nose engages in a snap-in state in the recess provided for this purpose. In order to release the latching connection between the housing or housing part and the bearing, only a tensile force has to be applied to the tool, by which the latching connection can be released. This contributes to uncomplicated and fast tool installation or removal, respectively.

BRIEF DESCRIPTION OF THE DRAWINGS

In the following, configuration examples of the medical instrument system according to the disclosure are described in detail with reference to the attached drawings. Identical elements are given the same reference signs. The embodiments are exemplary only and the disclosure is not limited thereto.

DETAILED DESCRIPTION

The following describes configuration examples of the present disclosure based on the accompanying figures.

Figure 1:
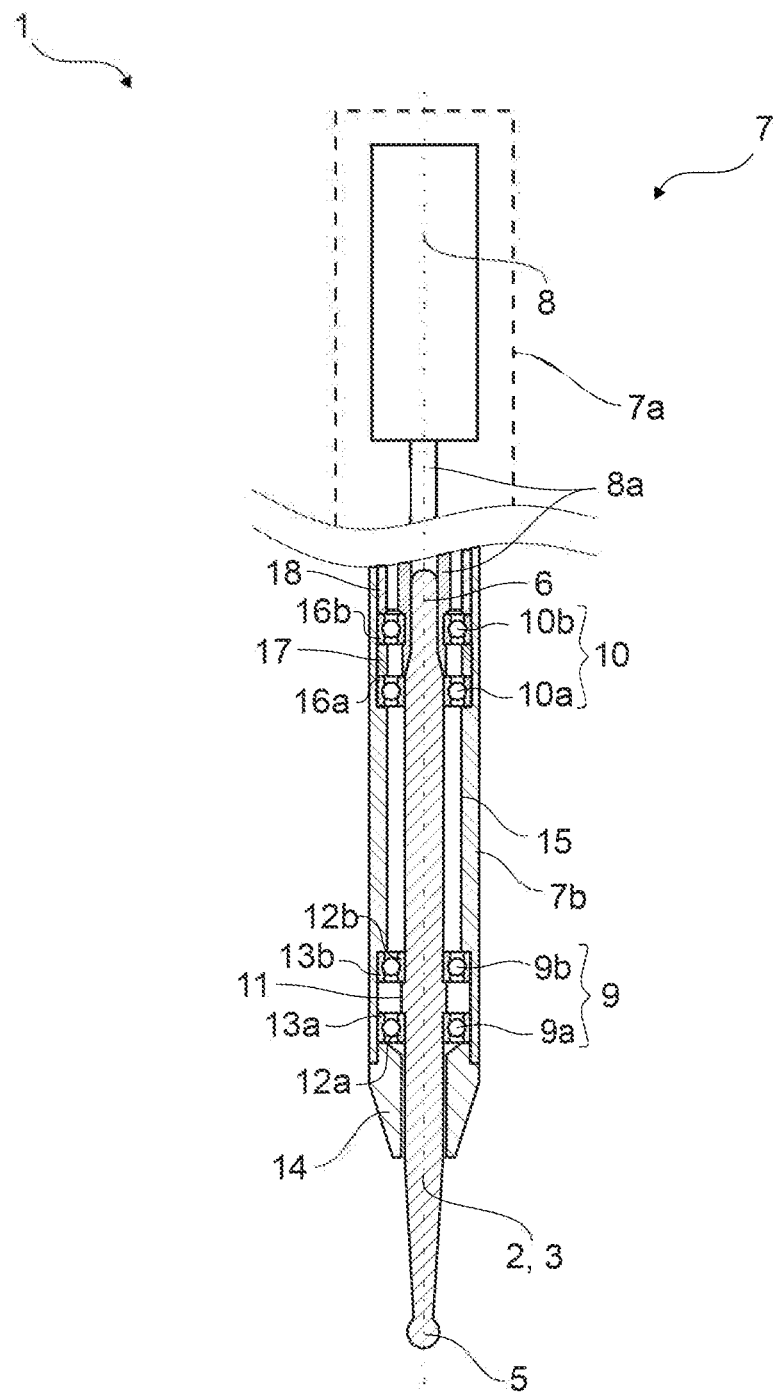
FIG. 1 shows schematically a partial sectional view of a medical instrument system according to a preferred configuration example.

FIG. 1 schematically shows a partial sectional view of a medical instrument system 1 according to a preferred configuration example. The instrument system 1 comprises a surgical tool 2 with a tool shaft 3 having a main portion 4, an effector 5 at its distal end portion and a coupling structure 6 at its proximal end portion. Furthermore, the instrument system 1 comprises a handpiece 7 with a housing 7a, indicated in FIG. 1, in which a drive unit/a drive 8 is housed and to which a tubular housing part 7b is connected and into which the tool 2, in particular the tool shaft 3, can be inserted in order to couple the tool 2 in a rotationally fixed manner to the drive unit 8 via the coupling structure 6 in such a way that a torque generated by the drive unit 8 is transmitted to the tool 2 via a torque transmission cable/path 8a.

According to the preferred configuration example, the drive unit 8 is configured as an electric motor integrated in the housing 7a. Alternatively, however, the drive unit 8 may also be configured in any other way, for example as a turbine. In addition, the drive may be arranged externally. In this case, a gearing mechanism is arranged in the housing 7a, which transmits the torque of the drive to the tool.

In order to be able to rotate the tool 2 within the handpiece 7, it has to be rotatably supported against the housing 7a and/or the housing part 7b during operation. In the instrument system 1 according to the preferred configuration example, a first pivot bearing 9 and a second pivot bearing 10 are arranged for this purpose between the tool 2 and the housing part 7b, wherein the first pivot bearing 9 is arranged in the region of the effector 5, i.e. at the distal end portion of the tool shaft 3, and the second pivot bearing 10 is arranged in the region of the coupling structure 6, i.e. at the proximal end portion of the tool shaft 3. According to the disclosure, the first pivot bearing 9 is connected in a rotationally fixed manner to the tool 2 or to the tool shaft 3 so as to form a unit which is inserted as a composite into the handpiece 7 and coupled to the drive unit 8. The second pivot bearing 10, on the other hand, is held in the housing part 7b in a rotationally fixed manner. This ensures that the first pivot bearing 9, i.e. the pivot bearing located at the distal end portion and subjected to the highest stress during operation, can be easily replaced with the tool 2. In other words, each change of the tool 2 is accompanied by a change of the first pivot bearing 9. Configuration examples for the configuration of the unit consisting of the first pivot bearing 9 and the tool shaft 3 are shown in the FIGS. 2A-5 described below.

Figure 5:
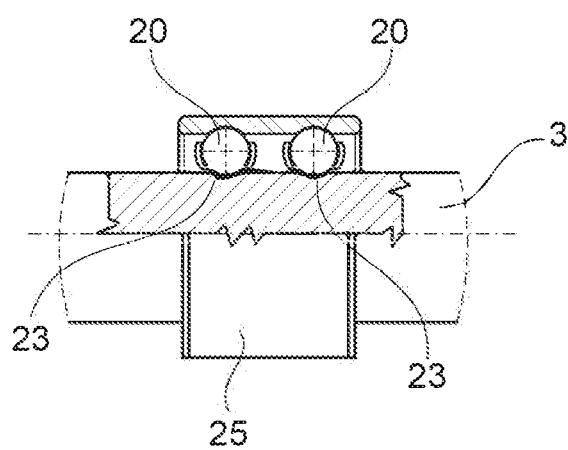
FIG. 5 shows a part of a tool shaft with a double bearing.

As can be seen in FIG. 1, both the first pivot bearing 9 and the second pivot bearing 10 in the preferred configuration example are configured as a composite with two cooperating ball bearings in each case. In particular, two pivot bearings 9a, 9b arranged distally on the tool shaft 3 form the first pivot bearing 9, whereas two pivot bearings 10a, 10b arranged proximally on the tool shaft 3 form the second pivot bearing 10. In the preferred configuration example, the pivot bearings 9a, 9b, 10, 10b are each configured as ball bearings. If the first pivot bearing 9a, 9b, as shown in FIG. 1, is configured as a composite, in accordance with the disclosure, only the pivot bearing 9a facing the effector 5 can be connected to the tool 2 to form the unit. Alternatively, however, it is also conceivable to connect both pivot bearings 9a, 9b forming the first pivot bearing 9 to the tool 2 in a rotationally fixed manner to form the unit, so that the two pivot bearings 9a, 9b are changed each time the tool 2 is changed. Furthermore, the first pivot bearing 9, as shown in FIG. 5 and described below, may also be configured as a multi-row, in particular double-row, pivot bearing, preferably as a double bearing.

According to the preferred configuration example shown in FIG. 1, the tool shaft 3 has a circumferential flange portion 11 which serves as an axial stop for the pivot bearings 9a, 9b. I.e. inner rings/inner bearing portions 12a, 12b of the pivot bearings 9a, 9b are each axially fixed to the flange portion 11. In order to fix an outer ring/outer bearing portion 13a of the distally arranged pivot bearing 9a, an additional cover sleeve 14 is arranged in the preferred configuration example. The cover sleeve 14 may be connected to the housing part 7b, for example via a screw connection, as shown in FIG. 1, or may be integral with the outer ring 13a of the pivot bearing 9a, as indicated in FIG. 3C.

The outer ring 13b of the pivot bearing 9b arranged further proximally is in turn supported by a circumferential wall 15 in the preferred configuration example. In the preferred configuration example, the circumferential wall 15 is configured as a projection that is integral with the housing part 7b. An outer ring 16a of the pivot bearing 10a, a spacer sleeve 17 and an outer ring 16b of the pivot bearing 10b are supported against the circumferential wall 15 in the distal direction. I.e. the outer ring 13b of the pivot bearing 9b is axially fixed via the circumferential wall 15. As can be seen in FIG. 1, in the preferred configuration example, a further spacer sleeve 18 is arranged for axial support of the pivot bearing 10b, which is supported in the proximal direction against the housing 7.

Figure 2A:
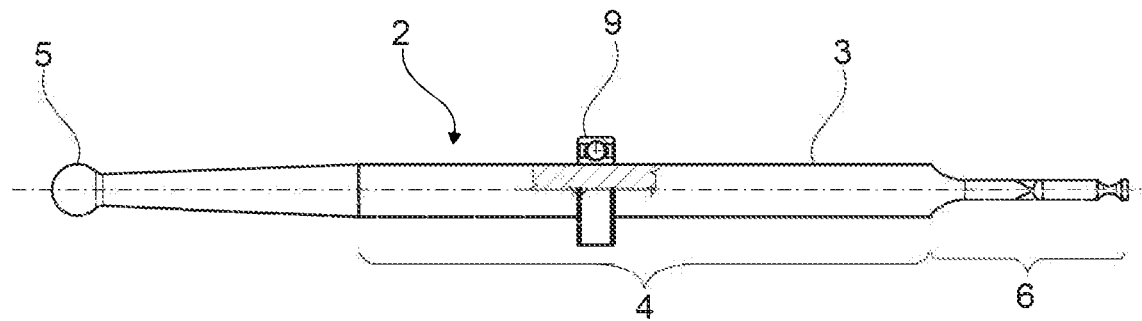
FIG. 2A shows a surgical tool with a pivot bearing attached to the tool.

FIG. 2A shows the surgical tool 2, configured as a surgical milling tool, with the tool shaft 3, the effector 5 at the distal end portion and the coupling structure 6 at the proximal end portion. The effector 5 is configured here as a milling cutter, but may also be a drill. The tool shaft 3 is conically tapered towards its distal end portion. The radial dimension of the coupling structure 6 is narrower than that of the tool shaft 3 so that it can be easily inserted into the handpiece 7. The housing 7a contains the drive unit 8, to which the tool 2 can be coupled via the coupling structure 6 in such a way that it adopts a rotational movement generated by the drive unit 8. In case of a rotation of the tool 2, a bearing between tool 2 and handpiece 7 is required, as described above. According to the disclosure, the first pivot bearing 9 is therefore located on the tool shaft 3 and is firmly connected to the tool shaft 3. The first pivot bearing 9 is arranged here on or near the central transverse axis of the tool shaft 3, but in any case in its main portion 3.

Figure 2B:
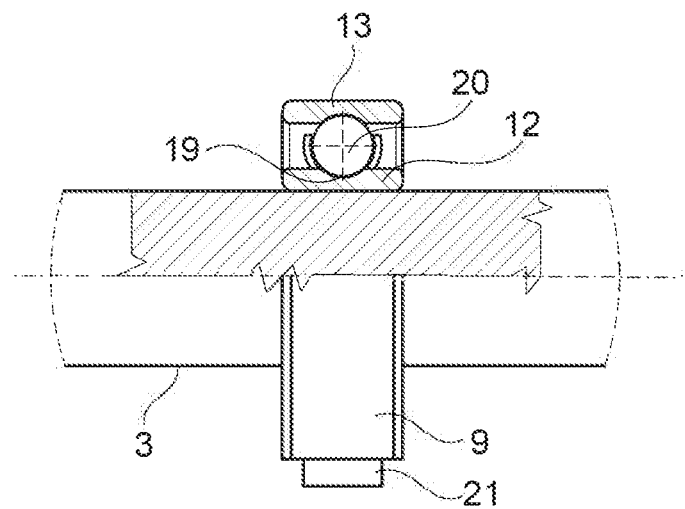
FIG. 2B is a cutaway view of FIG. 2A showing a pivot bearing and a part of a tool shaft supporting the pivot bearing.

FIG. 2B shows a section of FIG. 2A. The first pivot bearing 9, which is connected to the tool shaft 3 to form a unit, is configured as a ball bearing in this embodiment, but may alternatively be another rolling bearing or a plain bearing. The first pivot bearing 9 comprises the inner ring/inner bearing portion 12, a guide 19 on the inner bearing portion 12, balls (rolling elements) 20 and the outer bearing portion 13. In all figures (FIG. 2A, 2B and FIGS. 3A-3D), in which the first pivot bearing 9 with inner bearing portion 12 mounted on the tool shaft 3 is shown, the pivot bearing 9 may be either pushed onto the tool shaft 3 (releasable connection) or may be pressed on (non-releasable connection). In the other cases (FIG. 4A, 4B and FIG. 5), in which the first pivot bearing 9 without inner bearing portion 12 is mounted on the tool shaft 3 via a running groove, this running groove is part of the first pivot bearing 9 and replaces its inner bearing portion 12.

The first pivot bearing 9, as shown in FIG. 2B, has an axially extending latching nose 21 on its outer circumferential surface. However, it is also conceivable that the first pivot bearing has several latching noses 21. The latching noses 21 are provided to engage in correspondingly provided recesses (not shown) in the housing 7 in order to prevent the outer bearing portion 13 of the first pivot bearing 9 from taking over the rotational movement of the drive unit 8, to contribute to the bearing support between the tool 2 and the handpiece 7. The inner bearing portion 12 is fixedly connected to the tool shaft 3: either the inner bearing portion 12 is pushed onto the tool shaft 3 and thus the first pivot bearing 9 is formed detachably/separately from the tool 2, or the inner bearing portion 12 is pressed firmly onto the tool shaft 3 so that the tool 2 and the first pivot bearing 9 are formed non-detachably/integrally. In either case, the tool 2 or the tool shaft 3 and the first pivot bearing 9 form a unit.

Figure 3A:
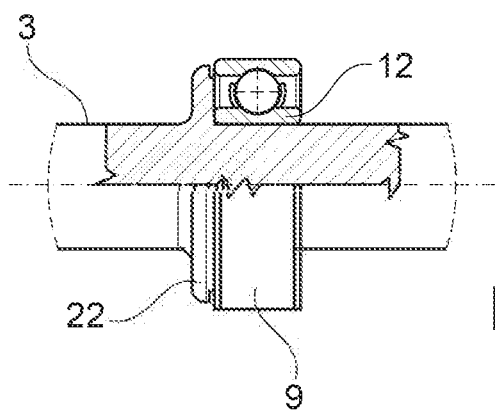
FIG. 3A shows a part of a tool shaft with a pivot bearing attached thereon and with a projection adjacent to the pivot bearing.

FIG. 3A shows a section of the tool shaft 3 that has the first pivot bearing 9. In the direction of the distal end portion of the tool 2, a projection 22 directly adjoins the first pivot bearing 9. The projection 22 is formed such that its maximum radial dimension on the side in contact with the first pivot bearing 9 is as large as the outer radial dimension of the first pivot bearing 9. In this embodiment, the projection 22 is formed in a flange-like manner. In the intended use of the tool 2, the projection 22 serves as a safeguard against undesired displacement of the first pivot bearing 9 towards the effector 5. The projection 22 may protect the first pivot bearing 9, which is pushed onto the tool shaft 3 (thus formed separately) and pressed on (thus formed integrally), from slipping towards the effector 5. In addition, the projection 22 prevents loss of the balls 20. Thus, the projection 22 has a protective function for the first pivot bearing 9. The projection 22 is integral/formed in one-piece with the tool shaft 3 and contacts the inner bearing portion 12 of the first pivot bearing 9 with a front side (facing the proximal end portion). The outer bearing portion 13 has an air gap to the projection 22.

Figure 3B:
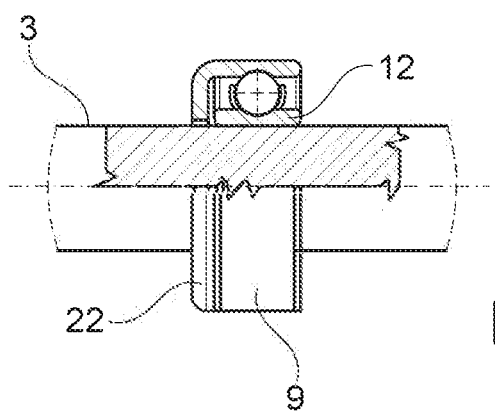
FIG. 3B shows a part of a tool shaft with a pivot bearing mounted thereon and with a modified projection adjacent to the pivot bearing.
Figure 3C:
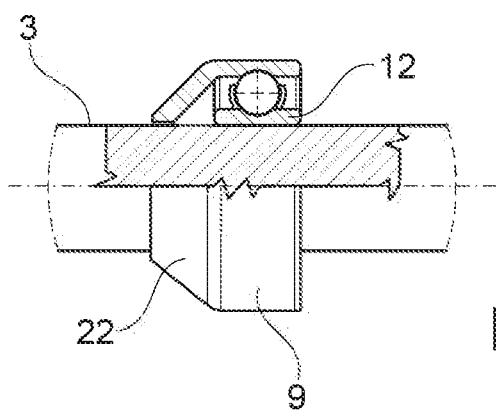
FIG. 3C shows a part of a tool shaft with a pivot bearing mounted thereon and with a further modified projection adjacent to the pivot bearing.

FIG. 3B shows the projection 22 in an alternative embodiment. Here, the projection 22 is formed in one piece with the outer bearing portion 13 and its radial dimension is the same (planar) over its entire height and corresponds to the radial dimension of the outer circumference of the first pivot bearing 9. There is an air gap to the tool shaft 3.

FIG. 3C shows another alternative embodiment of the projection 22. Here, the projection 22 is formed in one piece with the outer bearing portion 13 in such a way that the projection 22 continuously tapers (conically) in its radial dimension, starting from the radial dimension on the side that is in contact with the first pivot bearing 9, which here is as large as the outer radial dimension of the first pivot bearing 9, towards the distal end portion to a radial dimension that here is only slightly larger than the radial dimension of the tool shaft 3. Thus there is an air gap to the tool shaft 3.

Figure 3D:
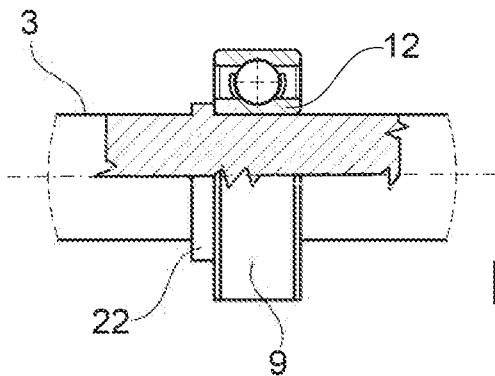
FIG. 3D shows a part of a tool shaft with a pivot bearing attached thereon and with a further modified projection adjacent to the pivot bearing.

FIG. 3D shows a modified projection 22 compared to the embodiments described so far. Its radial dimension is only as large as the outer radial dimension of the inner bearing portion 12, and thus does not secure the complete first pivot bearing 9, but only the inner bearing portion 12 against displacement in the axial direction towards the distal end portion. A projection 22 shortened in this way compared to the other embodiments may be flange-like, planar or conical.

Figure 4A:
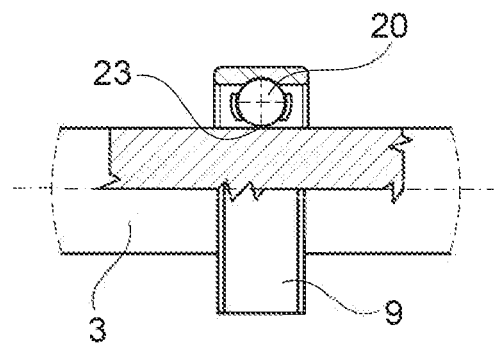
FIG. 4A shows a part of a tool shaft with a pivot bearing and a running groove formed as a groove.

FIG. 4A shows a part of the tool shaft 3 with a running groove in the form of a radially circumferential groove 23, which serves as a guide 19 for the balls 20 of the first pivot bearing 9. The inner bearing portion 12 of the first pivot bearing 9 is therefore unnecessary and omitted. The groove 23 is formed as a recess in relation to the outer surface of the tool shaft 3, so that the tool shaft 3 is narrower at this point than in the remaining main portion 4 of the tool shaft 3.

Figure 4B:
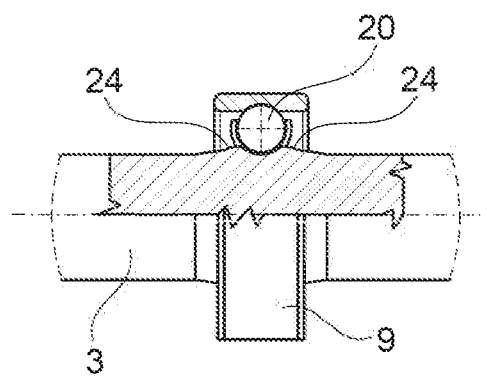
FIG. 4B shows a part of a tool shaft with a pivot bearing and a running groove formed between two lips.

FIG. 4B shows a part of the tool shaft 3 with an alternative embodiment of the running groove compared to FIG. 4A, which is defined as the area between two radially circumferential lips 24 spaced apart in the axial direction of the tool shaft 3. The lips 24, which are mound-shaped, rise from the outer surface of the tool shaft 3 and are configured and spaced apart to receive the balls 20 of the first pivot bearing 9. Thus, the tool shaft 3 has the same thickness at the location of the running groove as in the rest of the main portion 4 and is even reinforced at the level of the two lips 24.

Even if this is not shown, the tool shaft 3 may have several integrally or separately formed pivot bearings, in particular the pivot bearings 9a, 9b, and thus may also have several similarly or differently formed projections 22 or running grooves.

FIG. 5 shows a part of the tool shaft 3 that forms a unit with a double ball bearing 25. The double ball bearing 25 is a double-row ball bearing. For guiding the balls 20, the tool shaft 3 has two radially circumferential running grooves in the form of two grooves 23 spaced apart in the axial direction, in each of which a set of balls 20 circulates. The double ball bearing 25 therefore does not have an inner bearing portion 12. Although it is not shown, a three-row or multi-row pivot bearing may be used. It is also conceivable that the two-row or multi-row pivot bearing has an inner bearing portion and is pushed or pressed onto the tool shaft 3 and is protected by a projection 22.

It is generally possible to combine the embodiments shown here with each other, as long as this is technically reasonable.

The invention claimed is:

1. A medical instrument system comprising:
a handpiece having a housing in which a drive and/or a gearing mechanism is housed and having a housing part connected or connectable to the housing;
a surgical tool supported via a plurality of pivot bearings against the housing and/or against the housing part and which is coupled or is coupleable to the drive and/or the gearing mechanism in a rotationally and axially fixed manner in order to transmit a torque of the drive and/or the gearing mechanism to the surgical tool,
the surgical tool comprising a tool shaft,
the plurality of pivot bearings comprising a first pivot bearing at a distal end portion of the surgical tool and a second pivot bearing located proximal to the first pivot bearing,
the first pivot bearing being connected to the surgical tool to form a unit, and
the second pivot bearing being housed in a fixed position in the housing or the housing part, such that the second pivot bearing remains in the housing or the housing part even after uncoupling of the surgical tool from the drive and/or from the gearing mechanism.

2. The medical instrument system according to claim 1, wherein the first pivot bearing is formed via multiple pivot bearings of the plurality of pivot bearings that cooperate to form a composite and/or single-row or multi-row bearing.

3. The medical instrument system according to claim 1, wherein the second pivot bearing is formed via multiple pivot bearings of the plurality of pivot bearings that cooperate to form a composite and/or single-row or multi-row bearing.

4. The medical instrument system according to claim 1, wherein the first pivot bearing is formed separately from the tool shaft, so that the tool shaft and the first pivot bearing are connected to form a detachable unit.

5. The medical instrument system according to claim 1, wherein the first pivot bearing is formed integrally with the tool shaft, so that the tool shaft and the first pivot bearing are connected to form an inseparable unit.

6. The medical instrument system according to claim 5, wherein an inner bearing portion of the first pivot bearing is formed in one piece of material with the surgical tool.

7. The medical instrument system according to claim 1, wherein a circumferential flange portion is formed on the tool shaft and the first pivot bearing is axially fixed to the circumferential flange portion.

8. The medical instrument system according to claim 1, further comprising a cover sleeve configured to selectively attach at a distal end portion of the housing or the housing part with a portion of the surgical tool axially located between the cover sleeve and the housing or the housing part, in order to axially hold the first pivot bearing when surgical tool is coupled to the drive and/or the gearing mechanism.

9. The medical instrument system according to claim 1, further comprising a circumferential wall axially extending between the first pivot bearing and the second pivot bearing and contacting an outer ring of the first pivot bearing and an outer ring of the second pivot bearing when the surgical tool is coupled to the drive and/or the gearing mechanism, to thereby axially supporting the first pivot bearing and the second pivot bearing.

10. A medical instrument system comprising:
   a surgical tool comprising:
      a tool shaft extending from a proximal shaft end to a distal shaft end,
      an effector at the distal shaft end,
      a first bearing fixed to the tool shaft between the distal shaft end and the proximal shaft end, and
      a coupling structure at the proximal shaft end;
   a handpiece comprising:
      a housing,
      a drive unit located in the housing, and
      a second bearing fixed to the housing; and
   wherein the surgical tool is repositionable between:
      a connected configuration in which the first bearing is positioned in rotatably supporting contact between the tool shaft and the housing, the second bearing is positioned in rotatably supporting contact between the housing and the tool shaft, and the coupling structure is rotationally fixed to the drive unit, and
      a disconnected configuration in which the surgical tool is separate from the handpiece,
         wherein the surgical tool is configured to be repositioned between the connected configuration and the disconnected configuration as a single integral unit while the handpiece remains as a single integral unit.

11. The medical instrument system according to claim 10, wherein the drive unit comprises at least one of a motor, a gear mechanism, or a torque transmission cable.

12. The medical instrument system according to claim 10, wherein the housing comprises a plurality of connected housing parts.

13. The medical instrument system according to claim 12, wherein the housing comprises:
   a first housing part containing at least a portion of the drive unit; and
   a second housing part extending away from the first housing part along an axis to a distal end spaced from the first housing part, wherein an outer ring of the first bearing is positioned in rotatably supporting contact between the tool shaft and the second housing part when the surgical tool is in the connected configuration.

14. The medical instrument according to claim 13, wherein the second housing part comprises a circumferential wall that contacts the outer ring of the first bearing and an outer ring of the second bearing and holds the outer ring of the first pivot bearing and the outer ring of the second pivot bearing at a fixed spaced apart distance along the axis when the surgical tool is in the connected configuration.

15. The medical instrument according to claim 13, further comprising a cover sleeve configured to attach to the distal end of the second housing part with the first bearing captured along the axis between cover sleeve and the first housing portion when the surgical tool is in the connected configuration.

16. The medical instrument according to claim 10, wherein the second bearing is fixed to the housing by an outer ring of the second bearing, and to a distal end of the drive unit by an inner ring of the second bearing.

* * * * *